United States Patent
Carnevali

(10) Patent No.: US 7,422,184 B2
(45) Date of Patent: Sep. 9, 2008

(54) UNIVERSALLY POSITIONABLE PLATFORM FOR BEVERAGE HOLDER

(76) Inventor: Jeffrey D. Carnevali, 3262 - 36th Ave., Seattle, King County, WA (US) 98126

( * ) Notice: Subject to any disclaimer, the term of this patent is extended or adjusted under 35 U.S.C. 154(b) by 0 days.

(21) Appl. No.: 10/352,330

(22) Filed: Jan. 27, 2003

(65) Prior Publication Data
US 2004/0144904 A1   Jul. 29, 2004

(51) Int. Cl.
A47F 5/00 (2006.01)
B60R 7/00 (2006.01)

(52) U.S. Cl. ............ 248/278.1; 248/314; 248/309.1; 224/544; 224/926; 220/737

(58) Field of Classification Search ......... 248/278.1, 248/311.2, 314, 309.1, 310, 288.31; 224/544, 224/926; 220/739, 737, 740; 206/486
See application file for complete search history.

(56) References Cited

U.S. PATENT DOCUMENTS

| | | | | |
|---|---|---|---|---|
| 4,596,370 A * | 6/1986 | Adkins | | 248/311.2 |
| 4,747,507 A * | 5/1988 | Fitzgerald et al. | | 220/739 |
| 4,974,741 A * | 12/1990 | Gustafson et al. | | 220/739 |
| 5,022,549 A * | 6/1991 | Beaver | | 220/739 |
| 5,052,649 A * | 10/1991 | Hunnicutt | | 248/311.2 |
| 5,088,673 A * | 2/1992 | Chandler | | 248/311.2 |
| 5,123,558 A * | 6/1992 | Moloney | | 220/212 |
| 5,135,195 A * | 8/1992 | Dane | | 248/311.2 |
| 5,174,534 A * | 12/1992 | Mitchell | | 248/311.2 |
| 5,180,088 A * | 1/1993 | de Angeli | | 224/544 |
| 5,490,653 A * | 2/1996 | Ingwersen | | 248/311.2 |
| 5,601,268 A * | 2/1997 | Dunchock | | 248/311.2 |
| 5,651,523 A * | 7/1997 | Bridges | | 248/311.2 |
| 5,655,742 A * | 8/1997 | Whitman et al. | | 248/311.2 |
| 5,667,180 A * | 9/1997 | Duckworth | | 248/311.2 |
| 5,743,504 A * | 4/1998 | Miller | | 248/311.2 |
| 5,810,195 A * | 9/1998 | Sim | | 220/674 |
| 5,845,885 A * | 12/1998 | Carnevali | | 248/181.1 |
| 5,988,572 A * | 11/1999 | Chivallier et al. | | 248/176.1 |
| 6,039,207 A * | 3/2000 | Adamek | | 220/739 |
| 6,062,518 A * | 5/2000 | Etue | | 248/231.21 |
| 6,089,519 A * | 7/2000 | Laybourne | | 248/346.11 |
| 6,113,049 A * | 9/2000 | Miljanich | | 248/311.2 |
| 6,397,046 B1 * | 5/2002 | Kfoury | | 248/176.1 |
| 6,543,637 B1 * | 4/2003 | Osborn | | 220/737 |

* cited by examiner

Primary Examiner—Anita M King
(74) Attorney, Agent, or Firm—Charles J. Rupnick

(57) ABSTRACT

A positionable platform for use with a conventional beverage holder, the universally positionable platform including a first cup-shaped portion sized to fit within a conventional beverage holder; and a second substantially rigid cup-shaped portion coupled to the first flexible cup-shaped portion and being structured with a mechanical mounting platform. According to different embodiments of the positionable platform, the first cup-shaped portion is formed of a flexible material and structured with one or more resiliently pliable members structured to interfere with an internal wall surface of the beverage holder. According to other embodiments of the positionable platform, the first and second cup-shaped portions are securely fit over opposing first and second ends of the conventional beverage container. According to yet other embodiments of the positionable platform, the first and second cup-shaped portions are combined in a single unit sized similarly to a standard twelve (12) ounce beverage container.

8 Claims, 14 Drawing Sheets

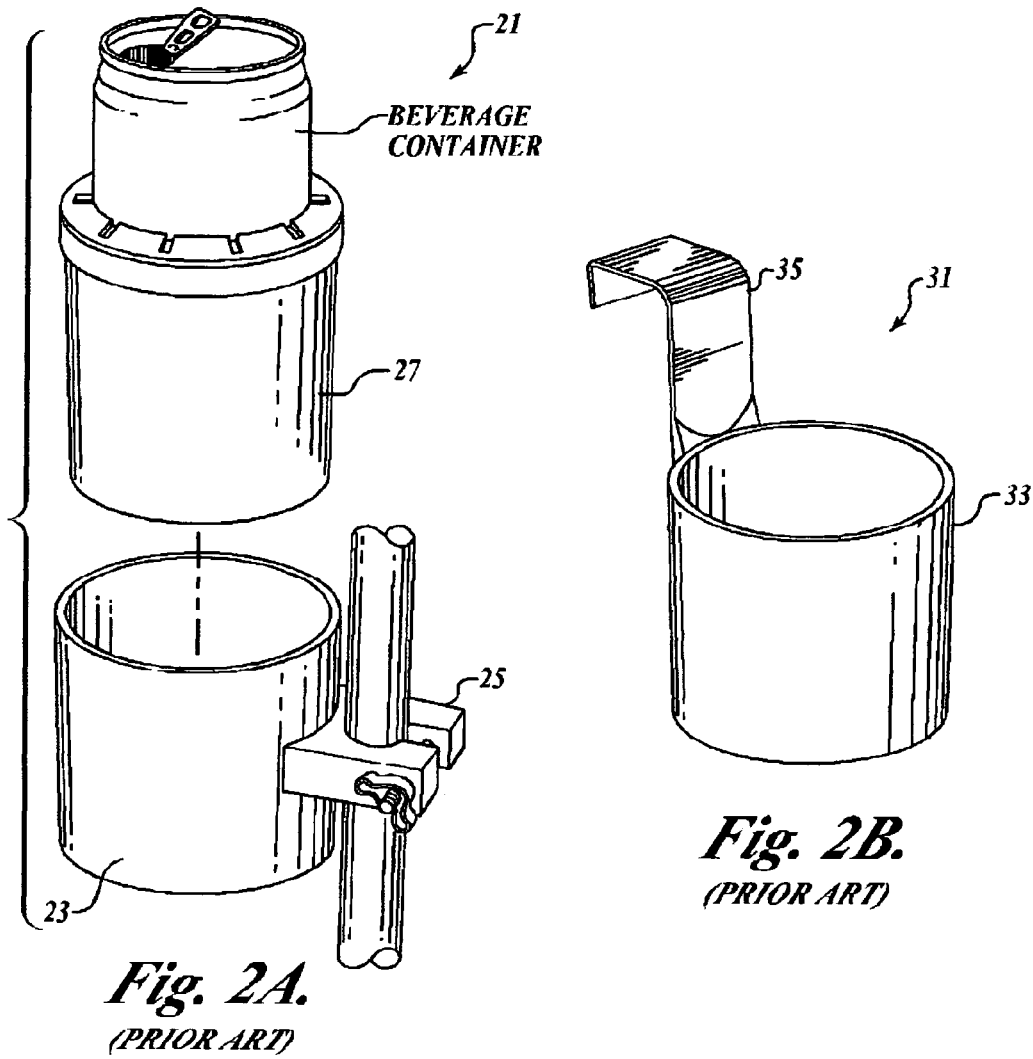
Fig. 2A.
(PRIOR ART)
Fig. 2B.
(PRIOR ART)
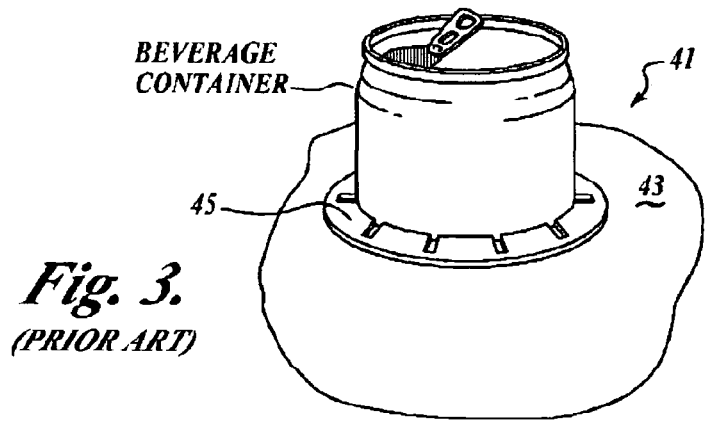
Fig. 3.
(PRIOR ART)

UNIVERSALLY POSITIONABLE PLATFORM FOR BEVERAGE HOLDER

FIELD OF THE INVENTION

The present invention relates to mounting devices and methods, and in particular to positionable mounting platforms.

BACKGROUND OF THE INVENTION

Universal mounting devices are known for providing a positionable mounting platform in different air, land and marine vehicles. These positionable mounting platforms are typically structured to support a wide variety of mobile devices, such as cellular telephones, portable global positioning system (GPS) receivers, notebook computers, Personal Digital Accessories (PDAs) and other mobile devices. However, to date these positionable mounting platforms have been structured for permanent or semi-permanent mounting on a fixed surface of the vehicle for stability. FIG. 1, for example, illustrates one such universal mounting device 1 that provides positionable mounting platform 3. As shown here and described in U.S. Pat. No. 5,945,885, which is incorporated by reference herein in its entirety, universal mounting device 1 is founded on a base 5 that is secured to a fixed surface with a quantity of screws or other fasteners 7. A sphere 9 of resiliently compressible material is presented on a post 11 for access by a pair of clamping arms 13 that together form a socket that is positionally secured relative to the sphere 9 when a clamping mechanism 15 is tightened. The positionable mounting platform 3 is presented on a second sphere 17 of resiliently compressible material that is captured in a second socket formed at the opposite end of the clamping arms 13 and relatively positionally secured by increased tightening of the clamping mechanism 15. The positionable mounting platform 3 (shown without features) is optionalty structured to support any of the above variety of mobile devices or another device or structure of the user's choice.

Portable beverage holders dedicated to a single use are also well-known. For example, portable holders are well-known for securely tending beverage containers of different sizes, such as liquid filled cans, glasses or bottles, in airplanes, automobiles or All Terrain Vehicles (ATVs), on boats, on bicycles or motorcycles, or other vehicles or conveyances where the beverage container is desired that be snugly maintained against adverse conditions.

FIGS. 2A and 2B both show examples of such portable beverage holders. Accordingly, FIG. 2A illustrates a portable beverage holder 21 for holding a standard twelve (12) ounce beverage can or bottle. The portable beverage holder 21 has a cup portion 23 with an integral clamping mechanism 25 whereby it is structured for mounting on a vertical rail or stem. Different variations of such portable beverage holders are structured for mounting on horizontal or diagonal rails. The user inserts a beverage container, such as a standard 12 ounce aluminum soda or beer can, in the cup 23 for hands-free operation of the vehicle or another activity. As shown here and described in U.S. Pat. No. 4,596,370, which is incorporated by reference herein in its entirety, the cup portion may be oversized for a standard 12ounce can to permit a pocket of flexible insulating material 27 between the can and the cup.

FIG. 2B illustrates a more flexible portable beverage holder 31 having a cup portion 33 suspended from a hanger 35 for connecting the portable holder to window frames, chair backs or the like.

Other fixed-position beverage holders are also well-known, examples of which include cylindrical recesses sized or oversized to accept a beverage cup, mug, bottle, or beverage can, such as a common 12 ounce glass or plastic bottle or aluminum can. Such fixed-position cylindrical recess beverage holders are often molded into the center consoles, door handles and dashboards of automobiles. FIG. 3 illustrates one known fixed-position beverage holder 41 formed in a convenient surface 43 and configured with a quantity of flexible fingers 45 structured to accept a standard 12 ounce can or bottle and hold it securely.

SUMMARY OF THE INVENTION

The present invention is a positionable platform for use with a conventional beverage holder that overcomes limitations of the prior art. The universally positionable platform of the invention a first end sized to fit within a conventional beverage holder and being structured with one or more resiliently pliable members structured to interfere with an internal wall surface of the beverage holder, and a second end coupled to the first end and being structured with a mechanical mounting platform.

According to one aspect of the invention, the invention is a universally positionable platform for use with a beverage holder structured to accept and securely tend a standard 12 ounce can or bottle, the universally positionable platform being formed of a substantially cylindrical base portion structured for secure insertion into a beverage holder structured to accept and securely tend a standard 12 ounce beverage container; and a mounting portion coupled to the base portion and being structured with a mechanical mounting means. The base and mounting portions of the positionable platform are both formed of a substantially rigid material and are coupled in a single integral unit. The coupled base and mounting portions are sized similarly to a standard 12 ounce beverage container.

According to another aspect of the invention, the first and second ends of the positionable platform are structured for secure attachment to opposing ends of a conventional beverage container, whereby the second end is coupled to the first end through the beverage container.

According to another aspect of the invention, the first end of the positionable platform is structured of a substantially flexible material.

According to another aspect of the invention, the second end of the positionable platform is structured of a substantially rigid material.

According to another aspect of the invention, one or both of the first and second ends of the positionable platform is further structured to space the mechanical mounting platform of the second end outside of the beverage holder.

According to another aspect of the invention, the mechanical mounting platform of the positionable platform includes a pair of spaced apart mounting holes formed in the second end.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 2A and 2B show examples of known portable beverage holders, wherein FIG. 2A illustrates a portable beverage holder having an integral clamping mechanism whereby it is structured for mounting on a vertical rail or stem, and FIG. 2B illustrates a more flexible portable beverage holder having a cup portion suspended from a hanger for connecting the portable holder to window frames, chair backs or the like;

FIG. 3 illustrates one example of a known fixed-position beverage holder;

FIGS. 5 and 6 further illustrate the embodiment of the universally positionable platform of the invention as illustrated in FIG. 4, wherein FIG. 5 is a cut-away prospective view of the universally positionable platform of the invention and FIG. 6 is a cross-section view of the universally positionable platform of the invention;

FIGS. 9, 10 and 11 each illustrates the cup-shaped lower insertion portion of the universally positionable platform of the invention according to a different alternative embodiment of the invention, wherein the one or more flexible or pliable members are embodied as one or more substantially concentric and co-parallel radially outwardly projecting fins, wherein FIG. 9 illustrates one embodiment of the flexible or pliable members being structured as a quantity of substantially concentric and radially outwardly projecting co-parallel fins, FIG. 10 illustrates one embodiment of the flexible or pliable members being structured as one or more substantially concentric and co-parallel radially outward projecting fins that are divided into spaced apart segments, and FIG. 11 illustrates one embodiment of the flexible or pliable members being structured as a single radially outwardly projecting fin formed adjacent to the base of the cup-shaped lower insertion portion;

FIGS. 14A and 14B together illustrate another alternative embodiment of the positionable platform of the invention, wherein FIG. 14A is a perspective assembly view of the universally positionable platform of the invention, and FIG. 14B is a bottom view of the universally positionable platform of the invention;

FIGS. 15A and 15B together illustrate another embodiment of the positionable platform of the invention, wherein FIG. 15A is a perspective assembly view of the universally positionable platform of the invention, and FIG. 15B is a cross-section view of the universally positionable platform of the invention;

FIGS. 17A and 17B together illustrate still another embodiment of the positionable platform of the invention, wherein FIG. 17A is a perspective assembly view of the universally positionable platform of the invention, and FIG. 17B is a cross-section view of the universally positionable platform of the invention.

DETAILED DESCRIPTION OF PREFERRED EMBODIMENT

In the Figures, like numerals indicate like elements.

The present invention is an apparatus and method for a universally positionable platform for use with a conventional beverage holder, the universally positionable platform including a bottom or lower end sized or undersized to fit within a conventional beverage holder, and a top end structured with a mechanical mounting platform to accept a mechanical connector thereto. According to at least one embodiment of the invention, the undersized bottom or lower end is structured with one or more resiliently pliable members intended to interfere with an internal wall surface of the beverage holder.

Figure 4:
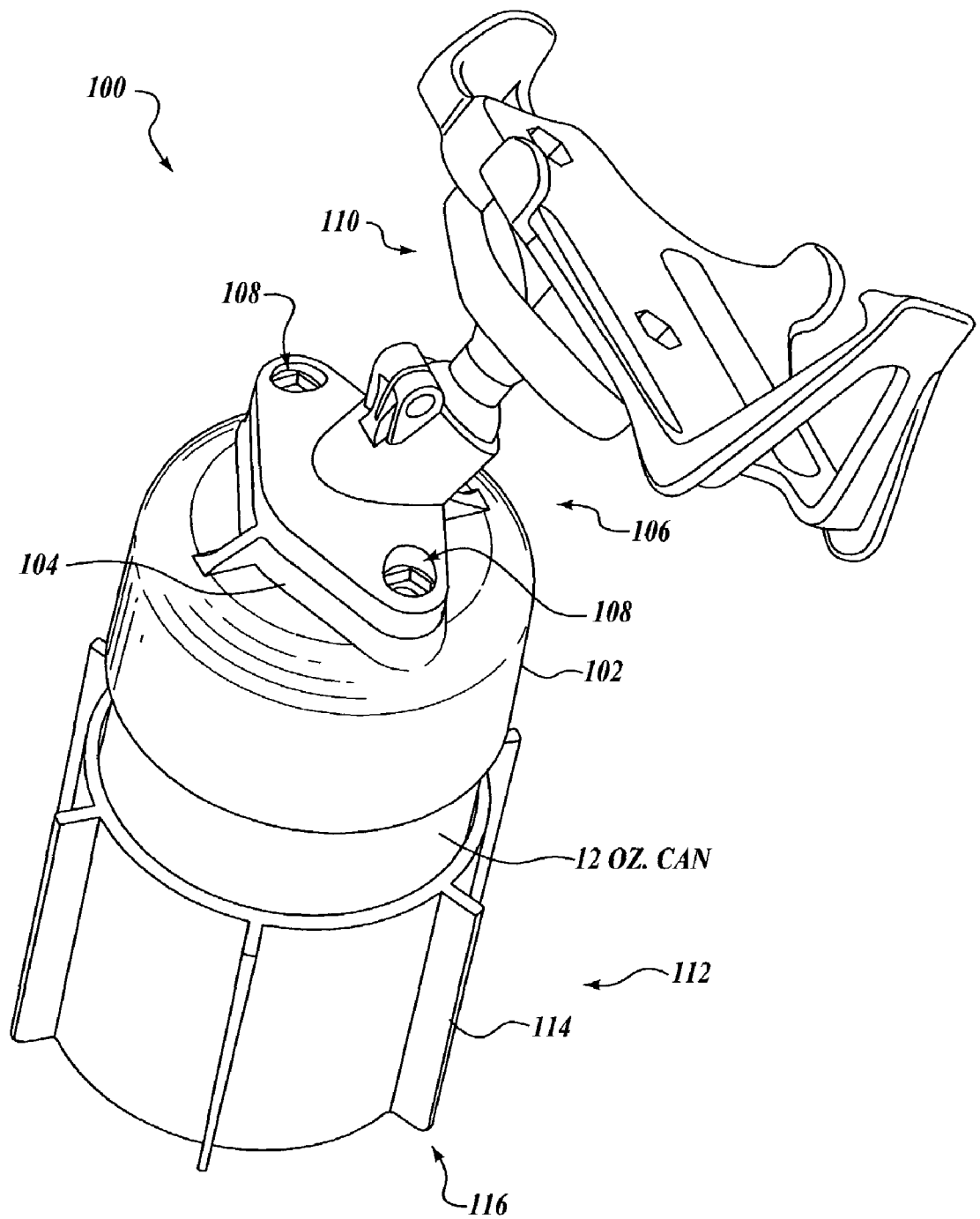
FIG. 4 illustrates one embodiment of the universally positionable platform of the invention as a cup-shaped mounting platform secured to one end of a conventional 12 ounce metal beverage can and a cup-shaped lower insertion portion secured to the other end of the beverage can, the lower insertion portion being structured for secure insertion into any one of the many different types of generally well-known portable and fixed-position beverage holders.

FIG. 4 illustrates the universally positionable platform 100 of the invention as a generally cylindrical body 102 sized approximately the same as or slightly larger than a conventional twelve (12) ounce hollow glass or plastic bottle or metal beverage can. That is to say, about two and one-half inches (2-½") or more in diameter by about four and three-quarters to five inches (4-¾" to 5") more or less in length. The universally positionable platform 100 of the invention, as embodied in FIG. 4, includes a mounting platform 104 positioned at a first or upper platform portion 106. The mounting platform 104 is structured, for example, as a substantially rigid pedestal having a pair of spaced apart holes 108 (shown more clearly in subsequent figures) for mounting one or another known device platform 110, such as a spring-loaded platform structured to accept a cell phone, personal digital assistant (PDA) or hand-held-global positioning system (GPS) receiver. One such device platform is by example and without limitation the universally positionable ball-and-socket mounting device shown, which is commercially available from National Products, Incorporated of Seattle, Wash., USA.

The first or upper platform portion 106 of the generally cylindrical body 102 having the mounting platform 104 positioned thereon projects from or above a second or lower insertion portion 112 that is structured for being securely inserted into any one of the many different types of generally well-known portable and fixed-position beverage holders, such as but not limited to those portable and fixed-position beverage holders discussed herein and commonly found in or for use with many different vehicles. Thus, according to the embodiment of the invention disclosed in FIG. 4, the second or lower insertion portion 112 of the generally cylindrical body 102 is sized to enter any one of many different portable and fixed-position cylindrical-bore beverage holders. Furthermore, the lower insertion portion 112 of the cylindrical body 102 is structured with one or more resiliently pliable members 114 sized to compress during entry into the internal bore of the beverage holder and to subsequently interfere with an internal wall surface of the beverage holder, thereby effectively securing the lower insertion portion 112 of the cylindrical body 102 within the beverage holder against loads applied at the mounting platform 104 portion of the upper platform portion 106. Upon removal from the beverage container, the pliable members 114 resiliently straighten and are once oriented for insertion into the same or another beverage holder.

The pliable members 114 are, by example and without limitation, a quantity of thin flexible fins of a resiliently flexible or pliable material projecting substantially at right angles from a surface of the lower insertion portion 112 of the cylindrical body 102. When the flexible or pliable members 114 are embodied as fins, the lower insertion portion 112 is injection molded or otherwise formed of a resiliently flexible or pliable material such as but not limited to a resiliently flexible or pliable plastic, a rubber, or another resiliently flexible or pliable material capable of forming resiliently compressible fins of the type described here.

When embodied as fins, the flexible or pliable members 114 optionally include a lead-in feature 116, such as a chamfer (shown) or radius, whereby the lower insertion portion 112 of the cylindrical body 102 is easily started into the bore of the beverage holder. The lead-in feature 16 also acts to encourage flexure or collapse of the individual pliable members 114 during entry into the bore of the beverage holder.

As illustrated in subsequent Figures, the universally positionable platform of the invention for use with a conventional beverage holder is realized according to any of a large number of different embodiments. The opposing upper platform and lower insertion portions 106, 112 of the body 102 and the mounting platform 104 are realized in different forms, and the different forms of the platform and insertion portions 106, 112 and the mounting platform 104 are realized in different combinations.

Figure 5:
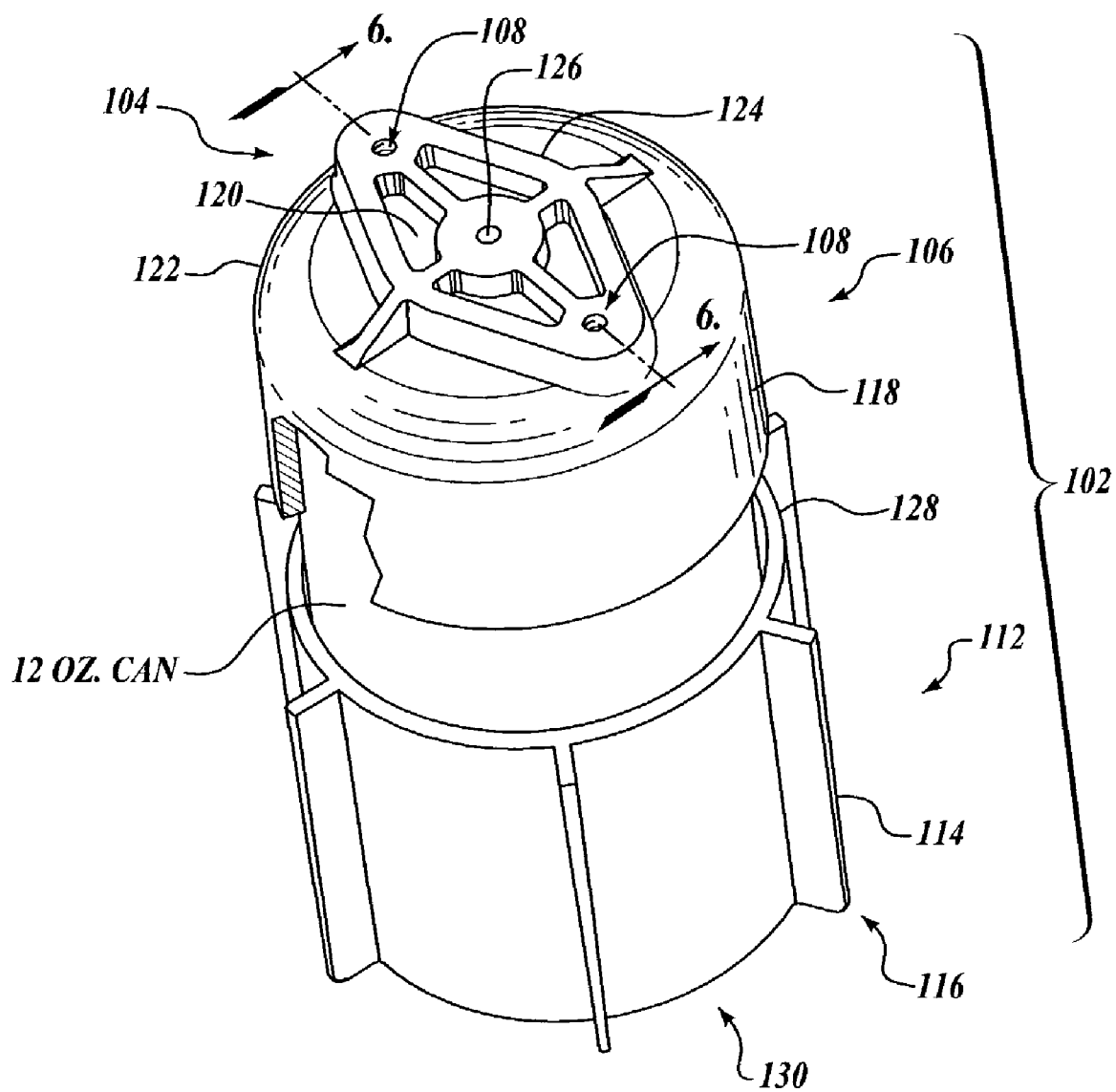
Figure 6:
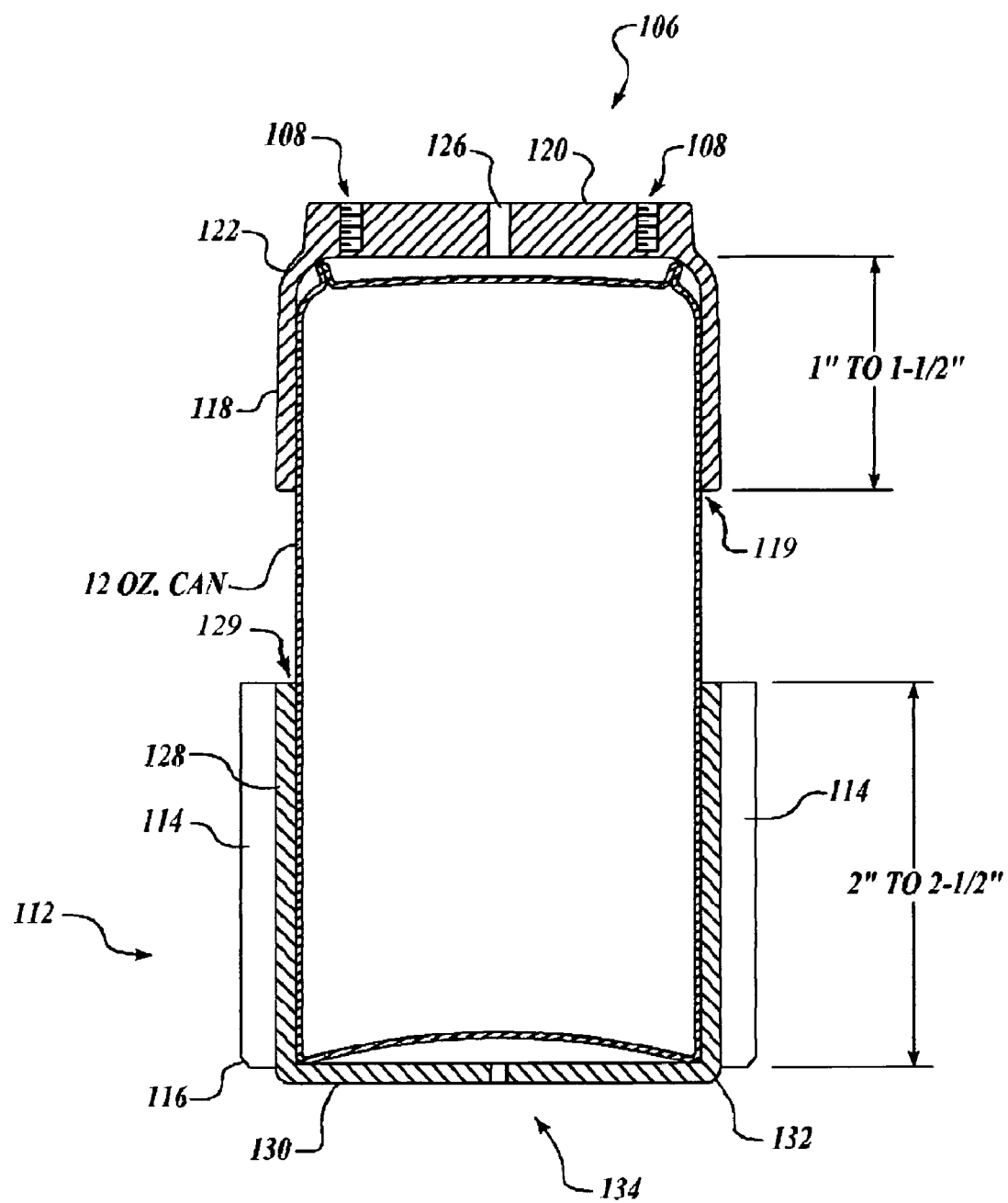

FIGS. 5 and 6 better illustrate the embodiment of the first or upper platform portion 106 of the generally cylindrical body 102 of the positionable platform 100 of the invention as illustrated in FIG. 4 with the device platform 110 removed for clarity, wherein FIG. 5 is a cut-away prospective view and FIG. 6 is a cross-section view. Accordingly, the upper platform portion 106 of the generally cylindrical body 102 is formed in the shape of a cup using a relatively rigid material, such as but not limited to a hard plastic, epoxy resin, or metal. When formed of a hard plastic, the upper platform portion 106 is optionally injection molded for ease of manufacturing. The integral cup shape includes a substantially cylindrical wall portion 118 ending in a substantially solid base portion 120. Optionally, the cylindrical wall and base portions 118, 120 intersect at a curving joint 122 formed, by example and without limitation, with external round and corresponding internal fillet shapes. The cylindrical wall portion 118 of the cup-shaped upper platform portion 106 of the present embodiment encompasses an internal space 119 sized to fit snugly over a first or top end of a common beverage container of the twelve (12) ounce aluminum can type to a degree that it is held snugly against externally applied forces. For example, the cup-shaped upper platform portion 106 encompasses the beverage container for a distance in the range of about one to one and one half inch (1" to 1-½"), or about one and one-quarter inch (1-¼").

The base portion 120 of the cup-shaped upper platform portion 106 is configured with the mounting platform 104 embodied as the pair of spaced apart holes 108 configured as clearance holes for screws or other fasteners, as shown in FIG. 5, or as threaded holes having the threads formed directly in the material of the base portion 120 or as a threaded insert (shown left to right). The base portion 120 is optionally embossed with a pattern of stiffeners 124 for reinforcing the base portion 120. Additionally, the base portion 120 may include a breather or exhaust hole 126 wherefrom air otherwise trapped between the beverage can and the base portion 120 is expelled from the cup-shaped upper platform portion 106.

FIGS. 5 and 6 also show respective perspective and cross-section views of the second or lower insertion portion 112 of the generally cylindrical body 102, which is sized to enter any one of many different portable and fixed-position cylindrical-bore beverage holders. The second or lower insertion portion 112 of the generally cylindrical body 102 is formed in the shape of a cup using a relatively flexible material, such as but not limited to a soft plastic or rubber. The integral cup shape includes a substantially cylindrical wall portion 128 ending in a substantially solid base portion 130. Optionally, the cylindrical wall and base portions 128, 130 intersect at a curving joint 132 formed, by example and without limitation, with external round and corresponding internal fillet shapes.

The quantity of flexible or pliable members 114 are embodied as fins formed on the external wall surfaces 128 and may extend over any part of the external wall surfaces 128 or over the entire length thereof.

The cylindrical wall portion 128 of the cup-shaped lower insertion portion 112 of the present embodiment encompasses an internal space 129 sized to fit snugly over a second or bottom end of the common 12 ounce aluminum beverage container to a degree that it is held snugly against forces applied externally to the beverage container. For example, the cup-shaped lower insertion portion 112 encompasses the bottom end of the beverage container for a distance in the range of about two to two and one-half inch (2" to 2-½"), or about two and one-quarter inch (2-¼").

The base portion 130 may optionally include a breather or exhaust hole 134 wherefrom air otherwise trapped between the beverage can and the base portion 130 is expelled from the cup-shaped lower insertion portion 112.

Figure 7:
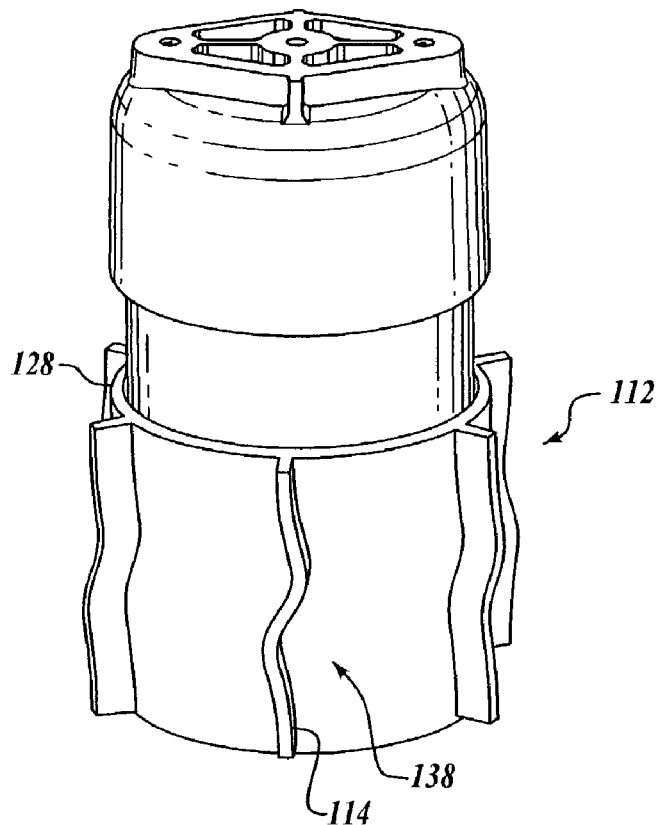
FIG. 7 illustrates the cup-shaped lower insertion portion of the universally positionable platform of the invention according to an alternative embodiment of the invention, wherein the one or more flexible or pliable members are embodied as fins having a "wave" formed therein.

FIG. 7 illustrates the cup-shaped lower insertion portion 112 according to an alternative embodiment of the invention, wherein the one or more flexible or pliable members 114 are structured as fins having a "wave" 138 formed therein, in contrast to the substantially straight fin-shaped embodiments of the flexible or pliable members 114 shown in other figures.

Figure 8:
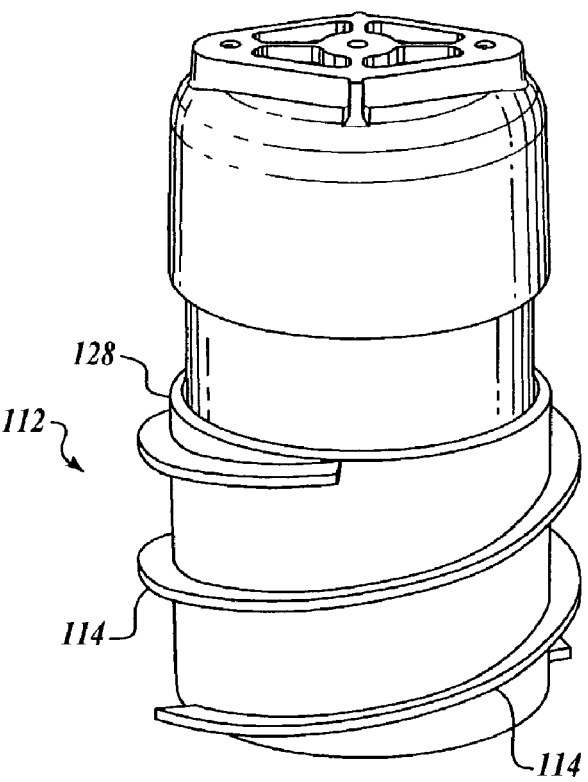
FIG. 8 illustrates the cup-shaped lower insertion portion of the universally positionable platform of the invention according to another alternative embodiment of the invention, wherein the one or more flexible or pliable members are embodied as one or more radially outwardly projecting spiral fins.

FIG. 8 illustrates the cup-shaped lower insertion portion 112 according to an alternative embodiment of the invention, wherein the one or more flexible or pliable members 114 are structured as one or more spiral fins projecting radially outward from the wall portion 128. Optionally, the one or more spiral fins are formed with a gradually decreasing radial extent from a maximum radial extent at the upper end of the wall portion 128 distal from the base portion 130 to a minimum radial extent upon approaching the wall portion 128 adjacent to the base portion 130.

Figure 9:
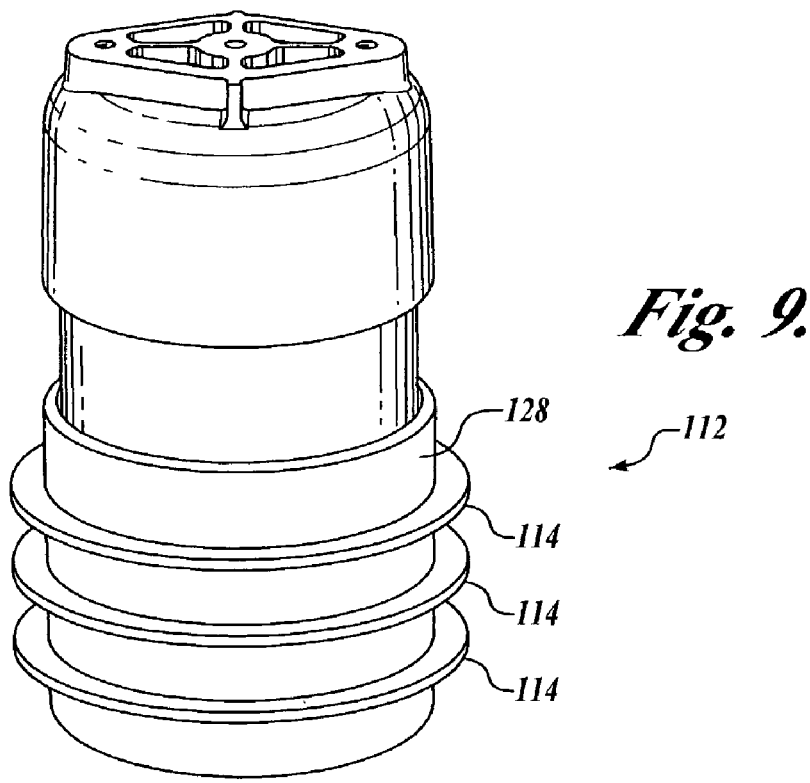
Figure 10:
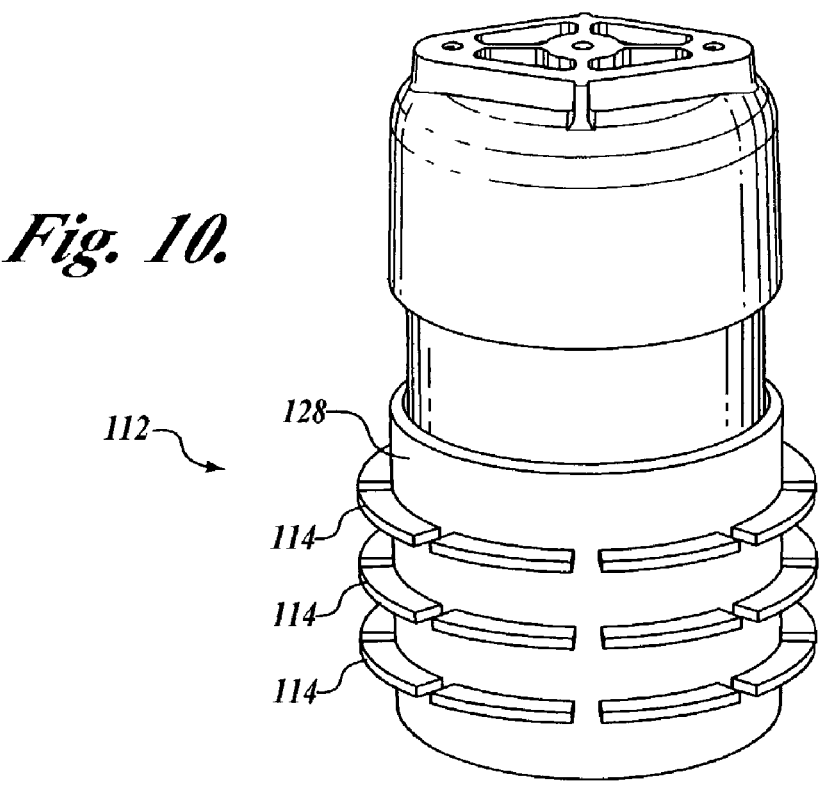
Figure 11:
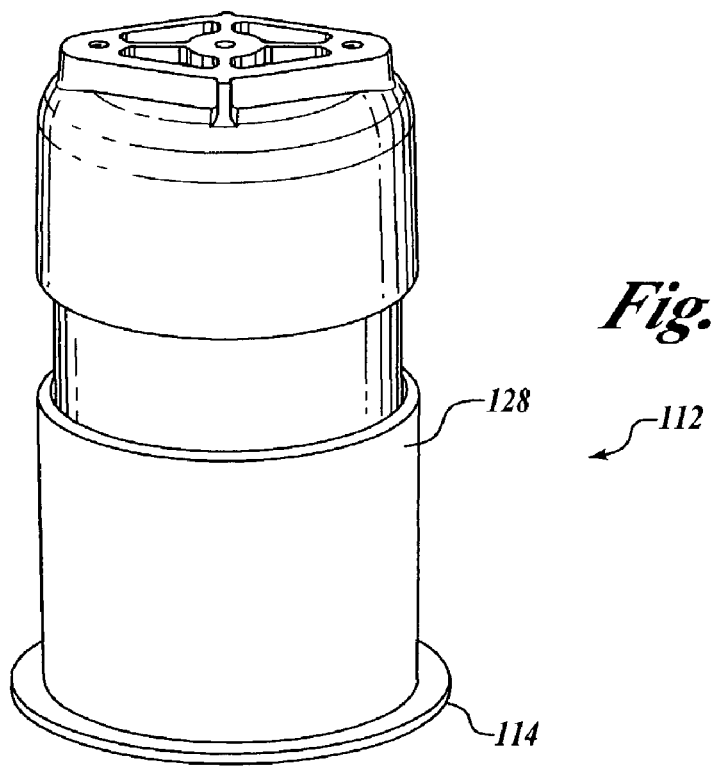

FIGS. 9, 10 and 11 each illustrates the cup-shaped lower insertion portion 112 according to a different alternative embodiment of the invention, wherein the one or more flexible or pliable members 114 are structured as one or more substantially concentric and co-parallel fins projecting radially outward from the wall portion 128. FIG. 9 illustrates one embodiment of the flexible or pliable members 114 being structured as a quantity of substantially concentric and radially outwardly projecting co-parallel fins. Optionally, the diameters of successive concentric fins are formed with a gradually decreasing radial extent from a fin at the upper end of the wall portion 128 distal from the base portion 130 having a maximum radial extent to a subsequent fin adjacent to the base portion 130 having a minimum radial extent.

According to the embodiment illustrated in FIG. 10, the one or more flexible or pliable members 114 structured as one or more substantially concentric and co-parallel radially outward projecting fins are divided into segments and spaced apart, the length of all of the segments of each concentric fin being less than the outer circumference of the cup-shaped insertion portion 112. Furthermore, the diameters of successive concentric segmented fins are formed with a gradually decreasing radial extent from a segmented fin at the upper end of the wall portion 128 distal from the base portion 130 having a maximum radial extent to a subsequent segmented fin adjacent to the base portion 130 having a minimum radial extent.

FIG. 11 illustrates the one or more flexible or pliable members 114 embodied as yet another alternative of the substantially concentric and co-parallel radially outward projecting fins wherein the one or more flexible or pliable members 114 is embodied as a single outward projecting fin formed concentric with the wall portion 128 adjacent to the base portion 130. Optionally, the single outward projecting fin is curved or inclined downwardly away from the base portion 130.

Figure 12:
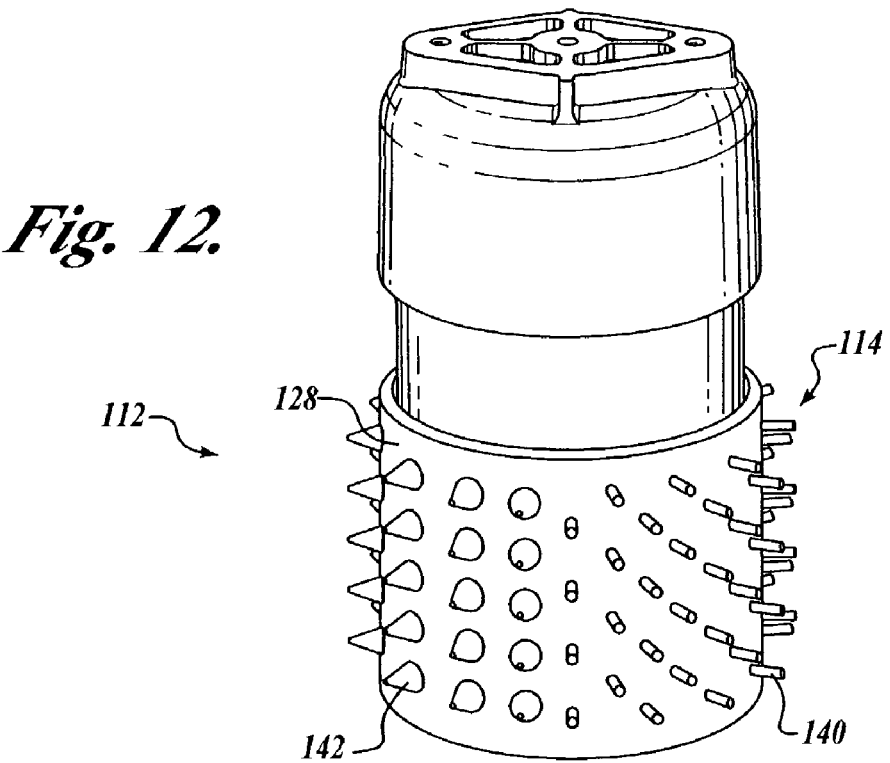
FIG. 12 illustrates the cup-shaped lower insertion portion of the universally positionable platform of the invention according to another alternative embodiment of the invention, wherein the one or more flexible or pliable members are embodied as one of both radially outwardly projecting cilia and radially outwardly projecting conical knobs.

FIG. 12 illustrates by example and without limitation the one or more flexible or pliable members 114 embodied as a quantity of cilia 140 projecting radially outwardly from the external surface of the wall portion 128. The cilia 140 are formed, by example and without limitation, by injection molding of the resiliently flexible or pliable plastic, a rubber, or another resiliently flexible or pliable material used in forming the cup-shaped lower insertion portion 112. The cilia 140 are structured to resiliently flex during entry into the internal bore of the beverage holder and to subsequently press outwardly from the wall portion 128 to interfere with an internal wall surface of the beverage holder. The flexible or pliable members 114 embodied as a quantity of cilia 140 thereby effectively secure the lower insertion portion 112 of the cylindrical body 102 within the beverage holder against loads applied at the mounting platform 104 portion of the upper platform portion 106. Upon removal from the beverage container, the cilia 140 resiliently straighten and are again oriented for insertion into the same or another beverage holder.

FIG. 12 also illustrates by example and without limitation the one or more flexible or pliable members 114 embodied as a quantity of conical knobs 142 projecting radially outwardly from the external surface of the wall portion 128. The conical knobs 142 are formed, by example and without limitation, by injection molding of the resiliently flexible or pliable plastic, a rubber, or another resiliently flexible or pliable material used in forming the cup-shaped lower insertion portion 112. The conical knobs 142 are structured to resiliently flex or resiliently radially compress during entry into the internal bore of the beverage holder and to subsequently press outwardly from the wall portion 128 to interfere with an internal wall surface of the beverage holder. The flexible or pliable members 114 embodied as a quantity of conical knobs 142 thereby effectively secure the lower insertion portion 112 of the cylindrical body 102 within the beverage holder against loads applied at the mounting platform 104 portion of the upper platform portion 106. Upon removal from the beverage container, the conical knobs 142 resiliently expand or straighten to their pre-insertion size and shape and are again oriented for insertion into the same or another beverage holder.

Figure 13:
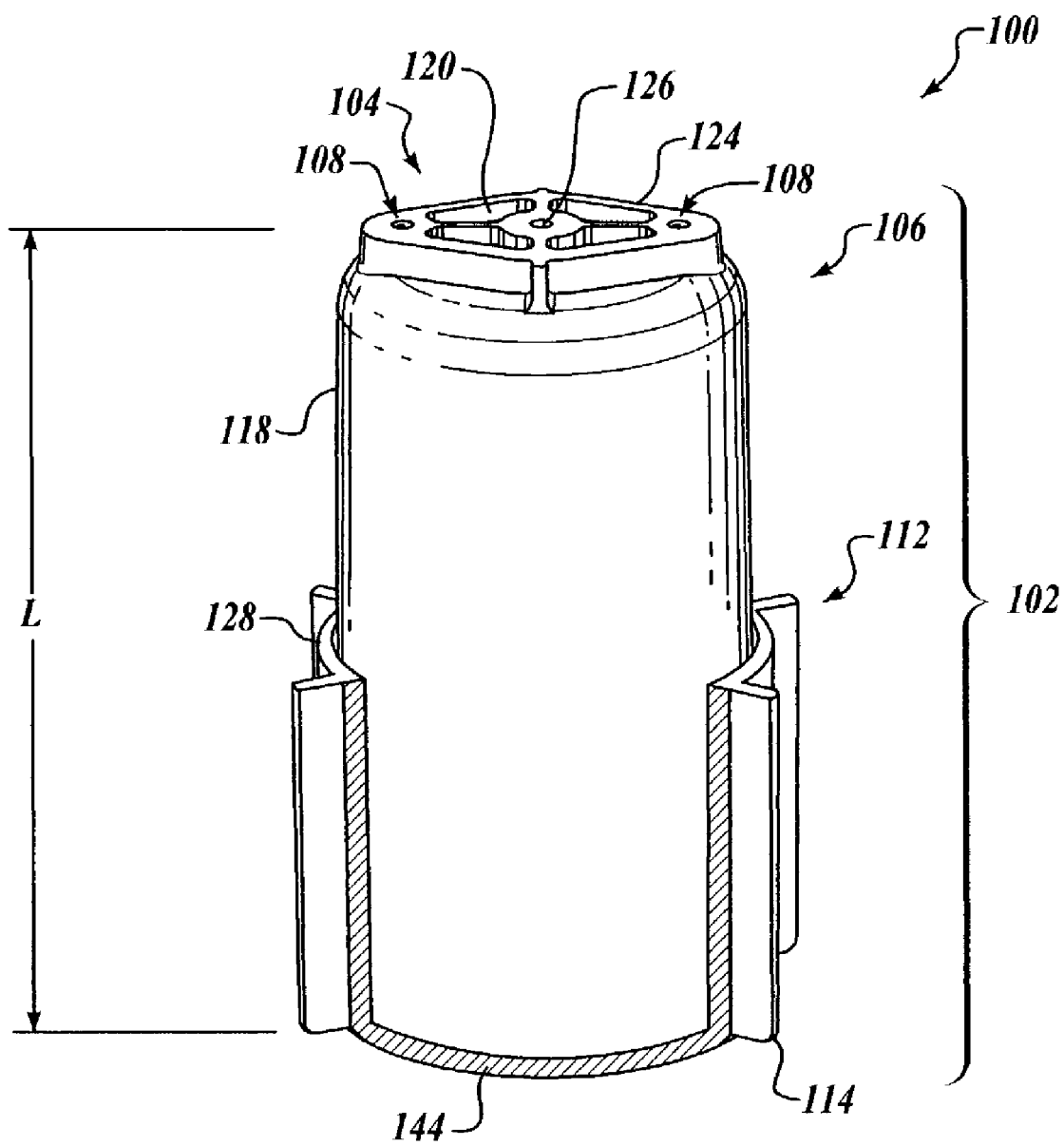
FIG. 13 illustrates the upper platform portion of the universally positionable platform of the invention according to another alternative embodiment of the invention, wherein the upper platform portion is embodied in a generally cylindrical or "can" shape of a common 12 ounce can-type beverage container sized to fit snugly into the cup-shaped lower insertion portion of the invention.

FIG. 13 illustrates the generally cylindrical body 102 of the positionable platform 100 of the invention wherein the upper platform portion 106 is embodied in the generally cylindrical or "can" shape of a common 12 ounce can-type beverage container. The upper platform portion 106 accordingly is sized to fit snugly into the cup-shaped lower insertion portion 112 substantially the same as the common 12 ounce can, as described herein. The generally cylindrical or can shaped upper platform portion 106 is thus sized approximately the same as a conventional 12 ounce metal beverage can. That is, as described herein, the upper platform portion 106 is about 2-½" more or less in diameter by about 4-¾" to 5" more or less in length. The generally cylindrical or can-shaped upper platform portion 106 is formed of a relatively rigid material, such as but not limited to a hard plastic, epoxy resin or metal. When formed of a hard plastic, the upper platform portion 106 is optionally injection molded with the features of the mounting platform 104 formed integrally therein for ease of manufacturing. The can-shaped upper platform portion 106 is as an example the hollow cup-shaped portion described in FIGS. 4-5 with the substantially cylindrical wall portion 118 being extended to the overall can length L, whereby weight and material are both minimized. Alternatively, the can-shaped upper platform portion 106 is substantially a can shape having a bottom portion 144 formed at the end of the wall portion 118 opposite from the mounting platform 104. The can-shaped platform portion 106 is optionally formed with an internal hollow so that weight and material are both minimized.

Figure 14A:
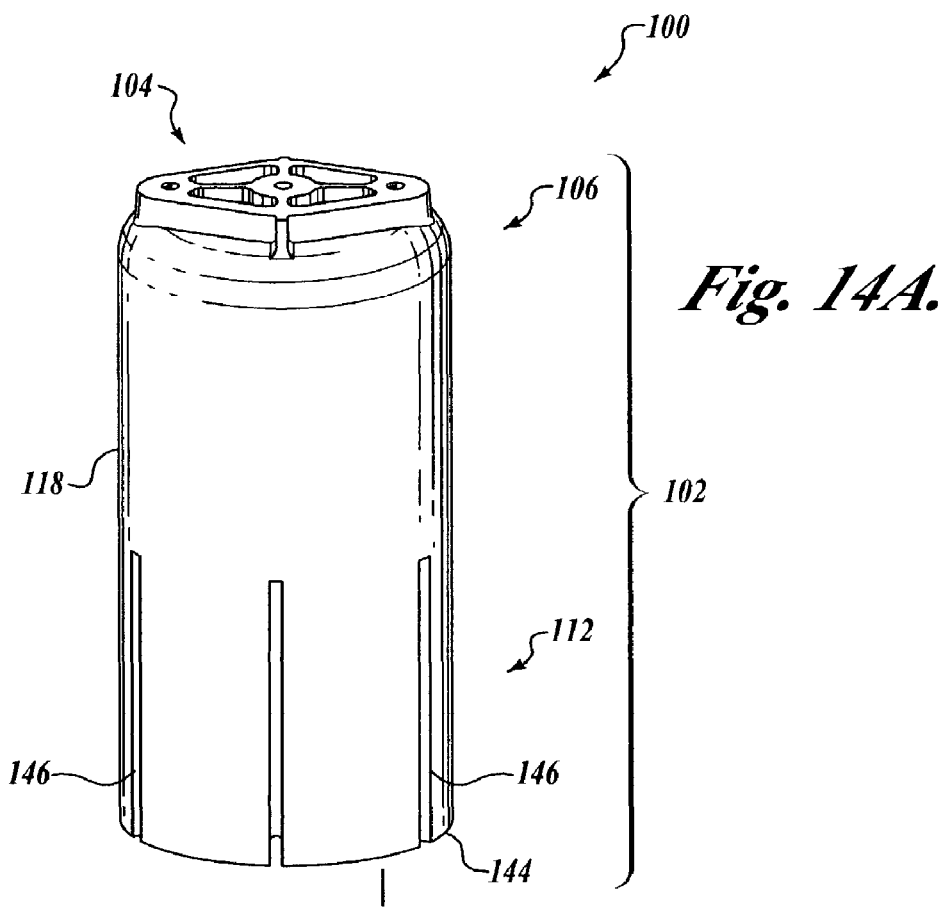
Figure 14B:
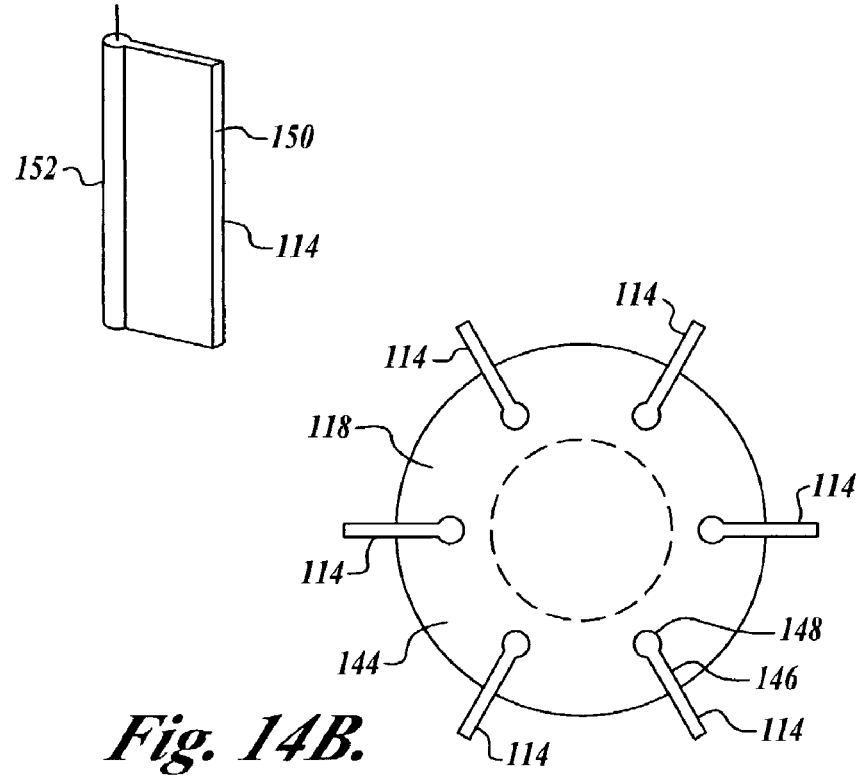

FIGS. 14A and 14B together illustrate another embodiment of the positionable platform 100 of the invention wherein FIG. 14A is a perspective assembly view and FIG. 14B is a bottom view. As illustrated, the upper platform portion 106 is either a substantially solid cylinder "can" shape of a common 12 ounce can-type beverage container or, optionally, includes a thick cylindrical wall portion 118 extended to the overall can length. In either case, the upper platform portion 106 is thus sized approximately the same as a conventional 12 ounce metal beverage can and includes at an upper end the features of the mounting platform 104, as described herein.

The generally cylindrical or can-shaped upper platform portion 106 of FIGS. 14A, 14B is formed of a relatively rigid material, such as but not limited to a hard plastic, epoxy resin or metal. When formed of a hard plastic, the upper platform portion 106 is optionally injection molded with the features of the mounting platform 104 formed integrally therein for ease of manufacturing. The can-shaped upper platform portion 106 is formed with a quantity of attachment apparatus 146 embodied as female apertures each having a female retaining feature 148 formed therein. By example and without limitation, the female apertures 146 are embodied as "keyhole" shaped slots (shown) wherein the female retaining feature 148 is an expanded or bore-shaped area situated at the slot base, although other retaining features are known and are considered to be equivalents of female keyhole retaining feature 148.

The flexible or pliable members 114 are embodied in FIGS. 14A, 14B as key-shaped inserts formed of a pliable plastic or rubber material. The flexible or pliable members 114 embodied as pre-formed key-shaped inserts are formed having a pliable fin portion 150 structured to fit within the female slots 146, and extending from one edge and contiguous therewith a male retaining feature 152 structured to mate with and be retained by the female keyhole retaining feature 148. The flexible or pliable members 114 embodied as pre-formed fin-shaped inserts are inserted into the slots 146 with the male retaining feature 152 fitting into the female keyhole retaining feature 148.

Alternatively, the flexible or pliable members 114 are molded in place in the can-shaped upper platform portion 106, with the male retaining feature 152 filling the female keyhole retaining feature 148, and the pliable fin portion 150 filling and extending radially outwardly from the female slots 146.

Figure 15A:
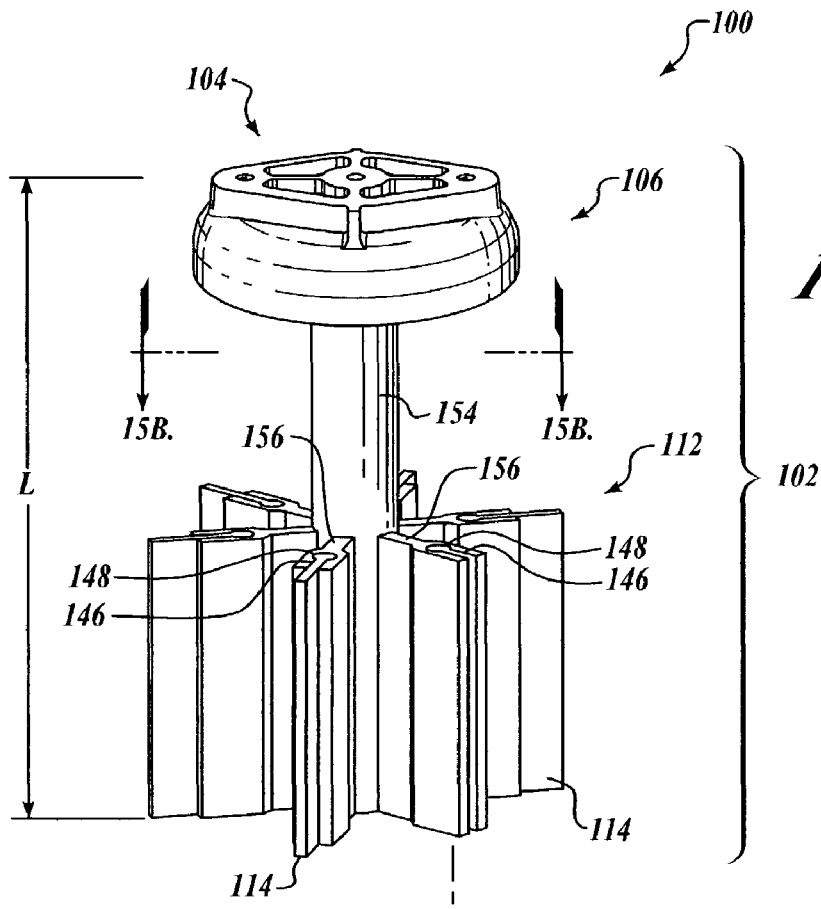
Figure 15B:
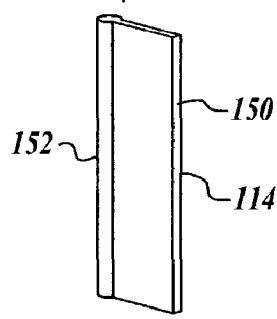
Figure 15B:
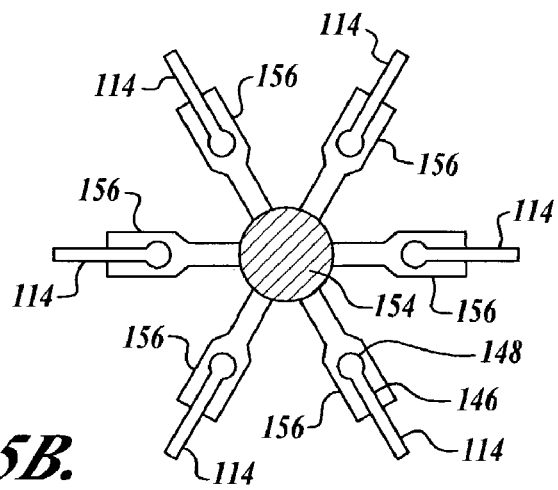

FIGS. 15A and 15B together illustrate another embodiment of the positionable platform 100 of the invention wherein FIG. 15A is a perspective assembly view and FIG. 15B is a cross-section view as shown. As illustrated, the upper platform portion 106 is either a substantially solid foreshortened structure extended to no more than the flexible or pliable members 114, or optionally as an substantially cup-shaped upper platform portion 106 as illustrated in FIGS. 5, 6. In either case, the upper platform portion 106 is thus sized approximately the same diametrical extent as a foreshortened conventional 12 ounce metal beverage can and includes at an upper end the features of the mounting platform 104, as described herein. The foreshortened can-shaped upper platform portion 106 is formed of a relatively rigid material, such as but not limited to a hard plastic, epoxy resin or metal. When formed of a hard plastic, the foreshortened upper platform portion 106 is optionally injection molded with the features of the mounting platform 104 formed integrally therein for ease of manufacturing.

A thick, optionally cylindrical, stem portion 154 extends from the foreshortened upper platform portion 106 to approximately the length L of a conventional 12 ounce beverage can. A quantity of relatively rigid or slightly flexible fins or arms 156 extend radially from the stem portion 154, one of the female apertures 146 described herein being structured along and contiguous with an outer radial surface of each of the fins or arms 156. By example and without limitation, each of the female apertures 146 is embodied as "keyhole" shaped slot (shown) wherein the female retaining feature 148 is an expanded or bore-shaped area situated at the slot base.

The flexible or pliable members 114 are embodied in FIGS. 15A, 15B as key-shaped inserts formed of a pliable plastic or rubber material. The flexible or pliable members 114 embodied as pre-formed key-shaped inserts are formed having a pliable fin portion 150 structured to fit within the female slots 146, and extending from one edge and contiguous therewith a male retaining feature 152 structured to mate with and be retained by the female keyhole retaining feature 148. The flexible or pliable members 114 embodied as pre-formed fin-shaped inserts are inserted into the slots 146 with the male retaining feature 152 fitting into the female keyhole retaining feature 148.

Alternatively, the flexible or pliable members 114 are molded in place in the can-shaped upper platform portion 106, with the male retaining feature 152 filling the female keyhole retaining feature 148, and the pliable fin portion 150 filling and extending radially outwardly from the female slots 146.

Figure 16:
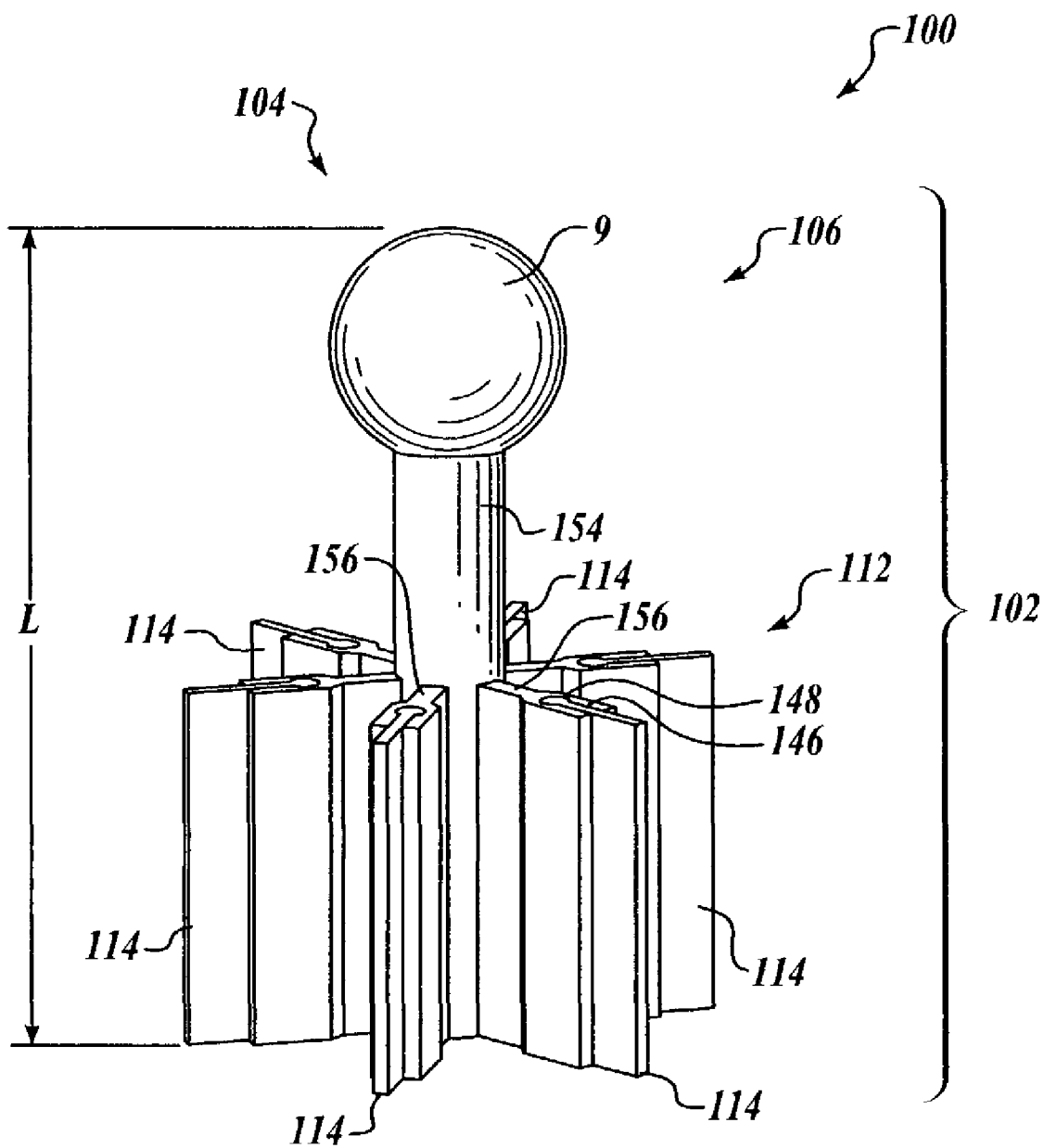
FIG. 16 illustrates still another embodiment of the positionable platform of the invention wherein the upper platform portion is embodied according to the universal mounting device described in U.S. Pat. No. 5,845,885.

FIG. 16 illustrates still another embodiment of the positionable platform 100 of the invention wherein the upper platform portion 106 is embodied according to the universal mounting device 1 as described in U.S. Pat. No. 5,845,885 and shown in FIG. 1 herein. Accordingly, a sphere 9 of resiliently compressible material is presented on the stem portion 154 for access by a pair of clamping arms 13 (shown in FIG. 1) that together form a socket that is positionally secured relative to the sphere 9, as described herein and in U.S. Pat. No. 5,845,885. The sphere 9 and stem portion 154 combine to approximately the length L of a conventional 12 ounce beverage can.

A quantity of the relatively rigid or slightly flexible fins or arms 156 extend radially from the stem portion 154, each of the radial arms 156 being structured with one of the female apertures 146 along and contiguous with its outer radial surface, as described herein. By example and without limitation, each of the female apertures 146 is embodied as "keyhole" shaped slot (shown) wherein the female retaining feature 148 is an expanded or bore-shaped area situated at the slot base. The flexible or pliable members 114 are embodied as either the pre-formed key-shaped inserts formed of a pliable plastic or rubber material or are molded in place, as described herein.

Figure 17A:
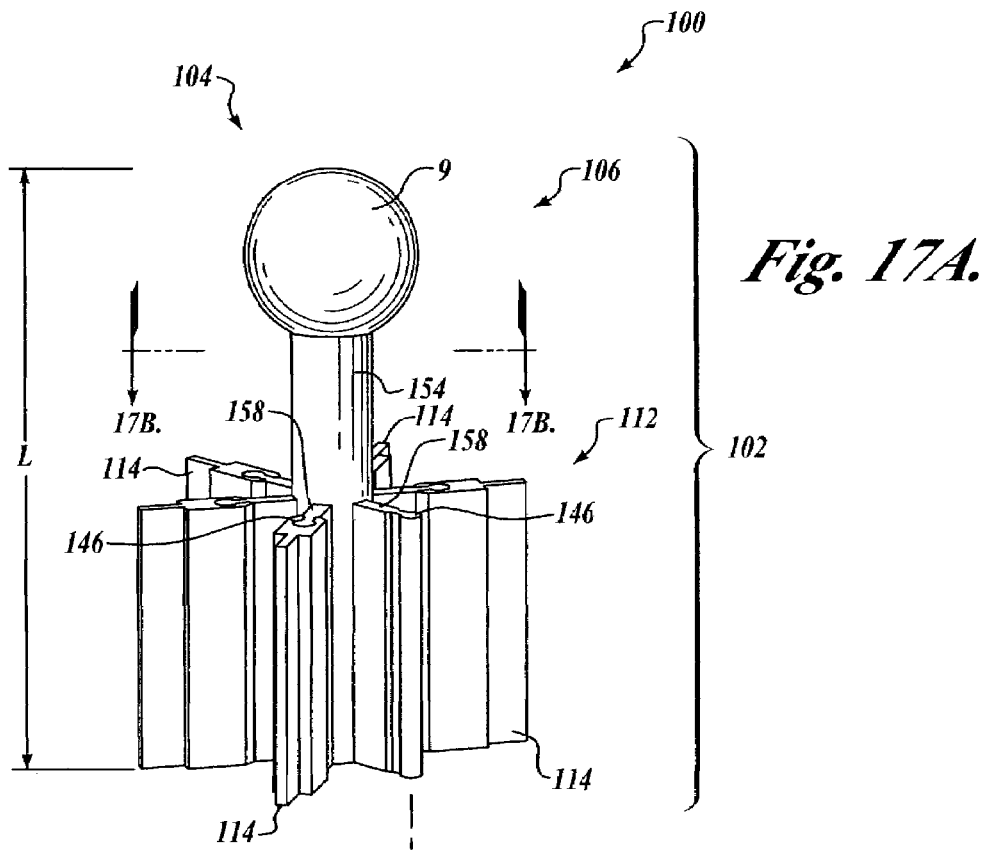
Figure 17B:
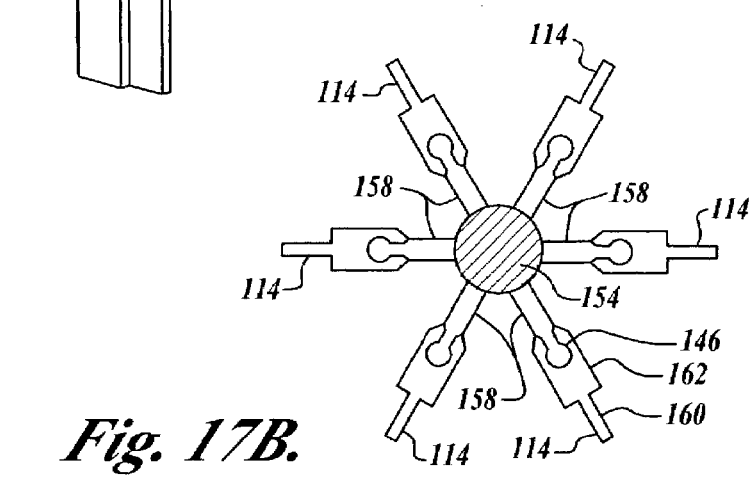

FIGS. 17A and 17B together illustrate another embodiment of the positionable platform 100 of the invention wherein FIG. 17A is a perspective assembly view and FIG. 17B is a cross-section view as shown. As illustrated, the upper platform portion 106 is embodied according to the universal mounting device 1 as described in U.S. Pat. No. 5,845,885 and shown in FIG. 1 herein, having the sphere 9 of resiliently compressible material presented on the stem portion 154. The sphere 9 and stem portion 154 combining to approximately the length L of a conventional 12 ounce beverage can.

A quantity of the relatively rigid or slightly flexible fins or arms 158 extend radially from the stem portion 154, each of the radial arms 158 being structured with one of the attachment apparatus 146 embodied as a part-cylindrical male retaining feature. The male retaining features 146 being embodied, by example and without limitation, as partial cylinders elongate to extend along and contiguous with an outer radial surface of each of the radial arms 158.

The flexible or pliable members 114 are embodied in FIGS. 17A, 17B as wishbone-shaped inserts formed of a pliable plastic or rubber material. The flexible or pliable members 114 embodied as pre-formed wishbone-shaped inserts are formed having a pliable fin portion 160

Extending from one edge of each pliable fin portion 160 and contiguous therewith a keyhole-shaped female retaining feature 162 is structured to fit over with and be retained by the attachment apparatus 146 embodied as the part-cylindrical male retaining feature. The flexible or pliable members 114 embodied as pre-formed fin-shaped inserts are inserted over the radial arms 158 with the keyhole-shaped female retaining feature 162 fitting over the part-cylindrical male retaining feature 146 at the radial extreme of the radial arms 158.

Alternatively, the flexible or pliable members 114 are molded in place over the radial arms 158, with the male retaining feature 146 filling the female keyhole retaining feature 162, and the pliable fin portion 160 filling and extending radially outwardly from the radial arms 158.

Although illustrated using the sphere 9 of resiliently compressible material presented on the stem portion 154, the embodiment of FIGS. 17A, 17B is equally practicable using the substantially cup-shaped upper platform portion 106 illustrated in FIGS. 5, 6.

As discussed herein and illustrated in FIG. 4, some known beverage holders are sized or otherwise tailored to accept a standard 12 ounce can or bottle snugly and hold it securely. According to one or more embodiments of the invention, the universally positionable platform includes a bottom or lower end sized to fit within such a tailored beverage holder, and a top end structured with one of the mechanical mounting platforms discussed herein and illustrated in the Figures for accepting a mechanical connector thereto.

Figure 18:
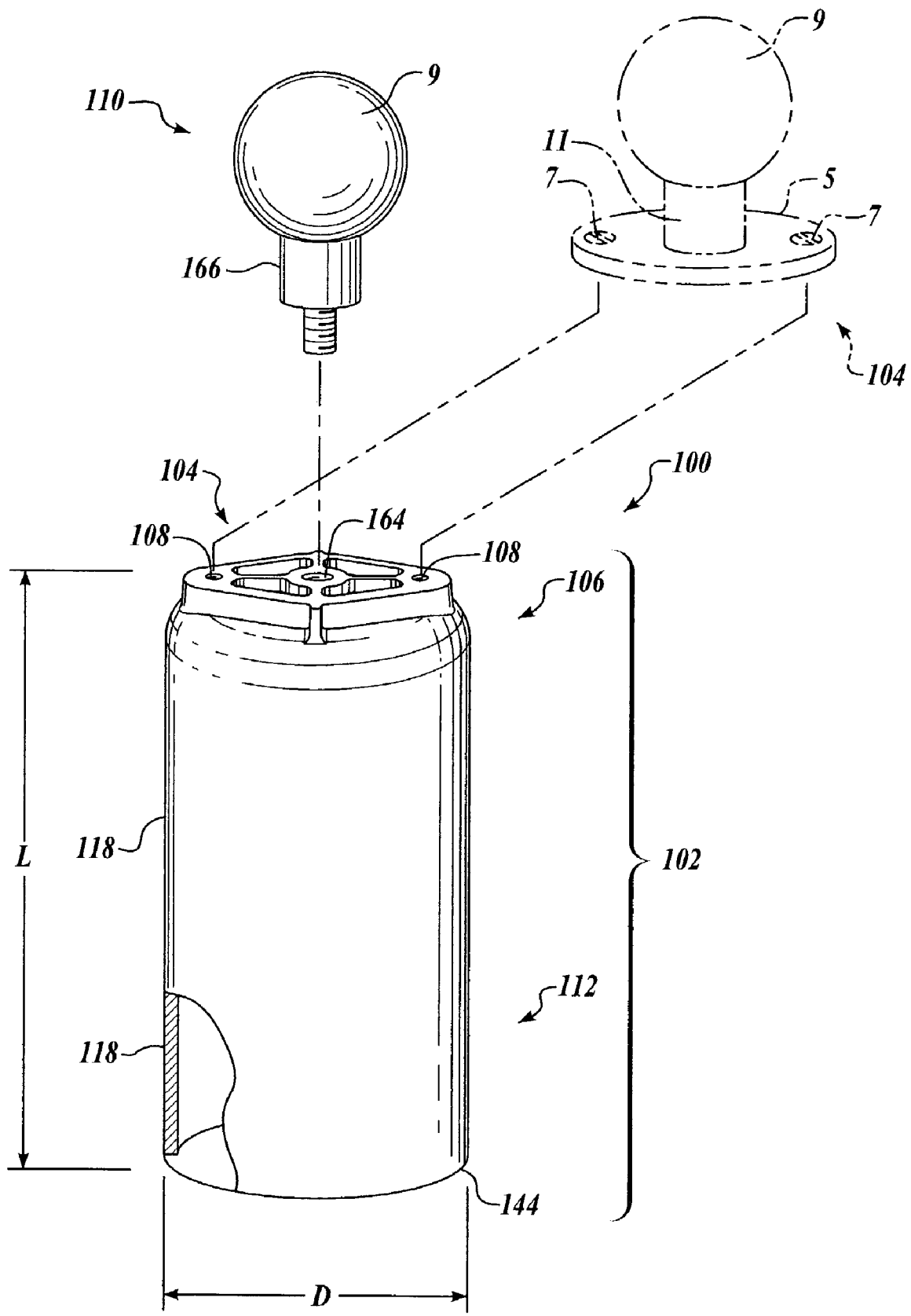
FIG. 18 illustrates three different embodiments of the positionable platform of the invention for use with a beverage holder structured to accept and securely tend a standard 12 ounce can or bottle.

FIG. 18 illustrates three different embodiments of the positionable platform of the invention for use with a beverage holder structured to accept and securely tend a standard 12 ounce can or bottle. Accordingly, the universally positionable platform 100 includes the generally cylindrical body 102 sized approximately the same as or slightly larger than a conventional twelve 12 ounce hollow glass or plastic bottle or metal beverage can. That is to say, having a diameter D of about two and one-half inches (2-½") or more and a length L of about four and three-quarters to five inches (4" to 5") more or less. The universally positionable platform 100 thus includes the substantially cylindrical base or insertion portion 112 that is structured for being securely inserted into any one of the beverage holders that is structured to accept and securely tend a standard twelve (12) ounce beverage container.

Figure 1:
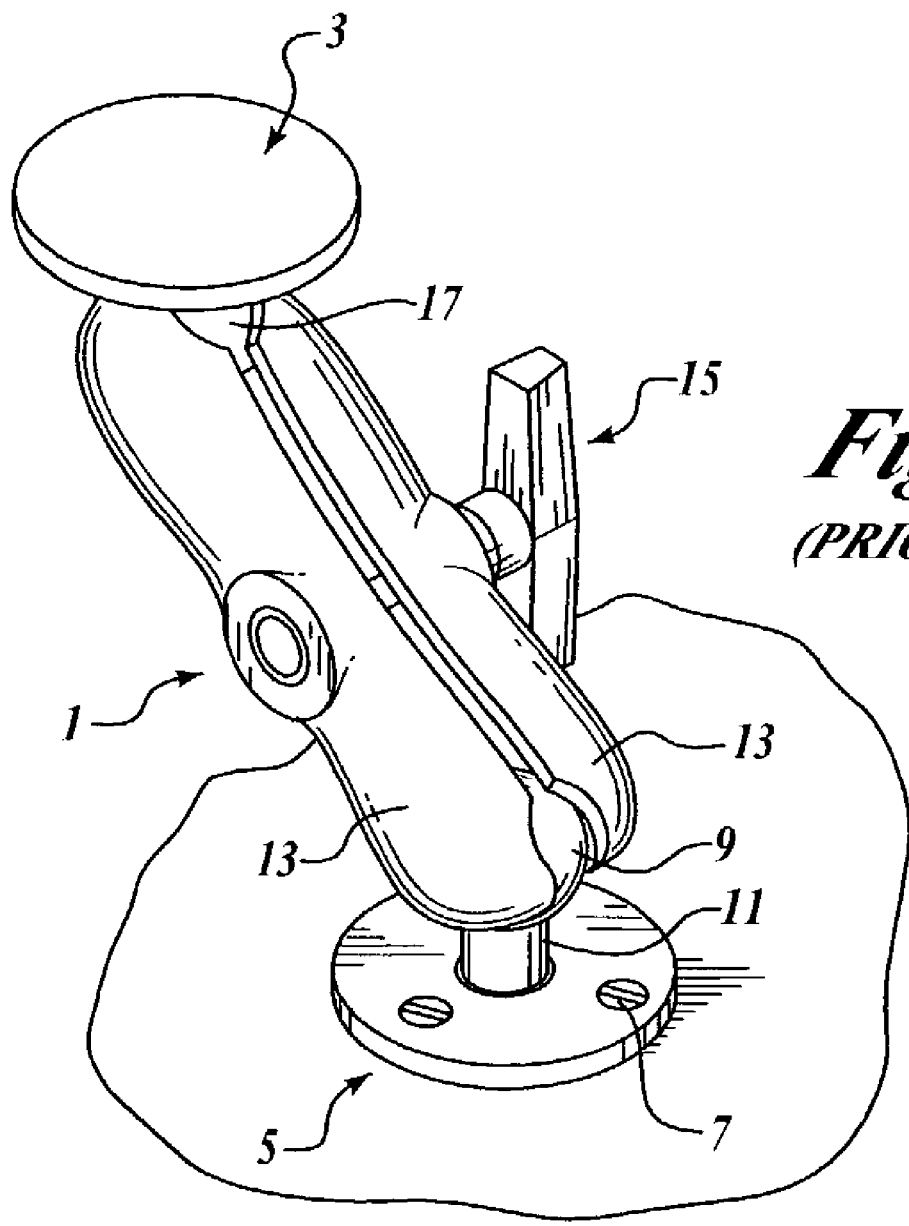
FIG. 1 illustrates one known universal mounting device described in U.S. Pat. No. 5,845,885.

The universally positionable platform 100 also includes the mounting portion 104 coupled to the base portion and being structured with one of the different mechanical mounting means described herein or another suitable mounting means. For example, the mounting platform 104 is structured as described herein as a substantially rigid pedestal having a pair of spaced apart holes 108 for mounting one or another known device platform 110 (shown in FIG. 4). Optionally, the mounting, platform 104 is structured to accept the base 5 portion of the universal mounting device 1 illustrated in FIG. 1 and disclosed in U.S. Pat. No. 5,845,885, which is incorporated by reference herein. The base 5 is secured with a quantity of screws or other fasteners 7. The universally positionable platform 100 thereby presents the sphere 9 of resiliently compressible material on a post 11 for access by a clampable socket, as illustrated in FIG. 1.

Alternatively, the base 5 portion of the universal mounting device 1 is formed integrally with the upper platform portion 106 of the apparatus as the mounting platform 104. According to another optional embodiment of the universally positionable platform 100 of the invention, the mounting platform 104 is structured with a substantially centrally located threaded bore 164 for mounting of a threaded device platform 110. For example, the device platform 110 is structured as the sphere 9 of resiliently compressible material discussed herein mounted on a threaded post 166 structured to thread into the threaded bore 164. Other configurations of the mounting platforms 104 are also contemplated by the invention and are considered to be equivalents of the several configurations described herein.

The base and mounting portions are both formed of a substantially rigid material. For example, the base and mounting portions are formed of such materials as hard plastic, epoxy resin, or metal. Optionally, the insertion base 112 and upper platform portion 106 having the mounting platform 104 are coupled to form the generally cylindrical body 102 as a single integral unit, as illustrated. The coupled base and mounting portions in combination are sized similarly to a standard 12 ounce beverage container. According to different embodiments of the invention, the integral cylindrical body 102 includes the substantially cylindrical base or insertion portion 112 and the upper platform portion 106, which are integrally formed either as a solid body or as a hollow body having a substantially tubular wall 118. The tubular wall 118 is either open at its base or is closed by the bottom portion 144, as described herein.

While the preferred embodiment of the invention has been illustrated and described, it will be appreciated that various changes can be made therein without departing from the spirit and scope of the invention.

What is claimed is:

1. A positionable platform for use with a conventional beverage holder, the positionable platform comprising:
   a first cup-shaped portion that is sized to fit within a beverage holder and is structured to securely fit over a first external end portion of a conventional beverage container, the first cup-shaped portion being structured with a plurality of resiliently pliable members radially extending from sidewalls first cup-shaped portion and being sized to resiliently interfere with an internal wall surface of the beverage holder; and
   a second cup-shaped portion formed of a substantially rigid material and structured to securely fit over a second external end portion of the same conventional beverage container, the second cup-shaped portion being structured with a plurality of mounting holes structured in a substantially rigid pedestal formed on an end surface of the second cup-shaped portion.

2. The positionable platform of claim 1 wherein the first cup-shaped portion further comprises a cup-shaped portion formed of a substantially pliant material.

3. The positionable platform of claim 1 wherein each of the plurality of resiliently pliable members radially extending from sidewalls first cup-shaped portion further comprises a fin-shaped member formed of a resiliently pliable material.

4. The positionable platform of claim 1 further comprising a conventional beverage container, wherein the first and second cup-shaped portions are securely fit over opposing first and second ends of the conventional beverage container.

5. A universally positionable platform for use with a beverage holder structured to accept and securely tend a standard twelve (12) ounce beverage container, the universally positionable platform comprising:
   a substantially cylindrical body sized similarly to a standard twelve (12) ounce beverage container;
   a substantially cylindrical base portion coupled to a first end the cylindrical body, the base portion being structured for secure insertion into a beverage holder structured to accept and securely tend a standard twelve (12) ounce beverage container
   a mounting portion coupled to a second end of the the cylindrical body opposite from the base portion, the mounting portion being structured with one of:
      a single mounting hole formed in an end surface of the mounting portion and aligned with a longitudinal axis thereof,
      a pair of spaced apart mounting holes formed in an end surface of the mounting portion and aligned with a longitudinal axis thereof, and
      a sphere of resiliently compressible material coupled to an end surface of the mounting portion.

6. The positionable platform of claim 5 wherein the base and mounting portions are coupled to the cylindrical body to form a positionable platform that is sized similarly to a standard twelve (12) ounce beverage container.

7. The positionable platform of claim 5 wherein the base and mounting portions are integral with the cylindrical body.

8. The positionable platform of claim 5 wherein the base portion further comprises one or more resiliently pliable members projecting therefrom and being structured to interfere with an internal wall surface of the beverage holder.

* * * * *